US012591977B2

(12) United States Patent
    Fu

(10) Patent No.: US 12,591,977 B2
(45) Date of Patent: Mar. 31, 2026

(54) AUTOMATICALLY AUTHENTICATING AND INPUTTING OBJECT INFORMATION

(71) Applicant: NBCUNIVERSAL MEDIA, LLC, Universal City, CA (US)

(72) Inventor: Qiang Fu, Universal City, CA (US)

(73) Assignee: VERSANT MEDIA, LLC, Englewood Cliffs, NJ (US)

( * ) Notice: Subject to any disclaimer, the term of this patent is extended or adjusted under 35 U.S.C. 154(b) by 416 days.

(21) Appl. No.: 18/147,642

(22) Filed: Dec. 28, 2022

(65) Prior Publication Data

US 2024/0221167 A1 Jul. 4, 2024

(51) Int. Cl.
  *G06T 7/13* (2017.01)
  *G06T 5/40* (2006.01)
  *G06T 7/66* (2017.01)
  *G06V 10/44* (2022.01)
  *G06V 10/74* (2022.01)

(52) U.S. Cl.
  CPC ................. *G06T 7/13* (2017.01); *G06T 5/40* (2013.01); *G06T 7/66* (2017.01); *G06V 10/44* (2022.01); *G06V 10/761* (2022.01); *G06T 2207/10016* (2013.01)

(58) Field of Classification Search
  CPC .... G06T 7/13; G06T 5/40; G06T 7/66; G06T 7/70; G06V 10/44; G06V 10/761; G06V 10/48; G06V 30/18067; G06V 30/416; G06K 2017/0038
  See application file for complete search history.

(56) References Cited

U.S. PATENT DOCUMENTS

| | | | |
|---|---|---|---|
| 9,208,403 B1* | 12/2015 | Aviv | G06T 7/168 |
| 2015/0363663 A1* | 12/2015 | Tombari | G06V 10/50 |
| | | | 382/170 |

OTHER PUBLICATIONS

H. Ye, G. Shang, L. Wang and M. Zheng, "A new method based on hough transform for quick line and circle detection," 2015 8th International Conference on Biomedical Engineering and Informatics (BMEI), Shenyang, China, 2015, pp. 52-56, doi: 10.1109/BMEI. 2015.7401472 (Year: 2015).*

(Continued)

*Primary Examiner* — Matthew C Bella
*Assistant Examiner* — Janice E. Vaz
(74) *Attorney, Agent, or Firm* — LEE, HONG, DEGERMAN, KANG & WAIMEY

(57) ABSTRACT

According to at least one embodiment, a multi-angle multi-time-point method authenticates 2D objects with high confidence by sampling the object through space and time while being capable of automatically authenticating and inputting object information. Some embodiments further enhance authentication confidence by utilizing unique characteristics of hologram and/or personal photo. While this method possesses artificial intelligence comparable to human's in term of authenticating and extracting information from 2D objects, it's also highly efficient and can achieve real-time performance (e.g., processing 5 frames per second) on ordinary personal computers. Structural information is first extracted from a 2D image to reduce processing time for subsequent steps as more operations on the 2D images are avoided. By employing similar divide-and-conquer strategy according to a binary search algorithm for 1D data array, a Visual Binary Edge Search Algorithm is applied to a 2D image application.

12 Claims, 15 Drawing Sheets

(56)     References Cited

OTHER PUBLICATIONS

Jinchang Ren, P. Astheimer and D. D. Feng, "Real-time moving object detection under complex background," 3rd International Symposium on Image and Signal Processing and Analysis, 2003. ISPA 2003. Proceedings of the, Rome, Italy, 2003, pp. 662-667 vol. 2, doi: 10.1109/ISPA.2003.1296359 (Year: 2003).*

L. Zuo, W. Chen, H. Qu, L. Huang, Z. Wang and Y. Chen, "An Intelligent Knowledge Extraction Framework for Recognizing Identification Information From Real-World ID Card Images," in IEEE Access, vol. 7, pp. 165448-165457, 2019, doi: 10.1109/ACCESS. 2019.2929816 (Year: 2019).*

* cited by examiner

Bank of XYZABC

1234 5678 9101 2345

GOODTHRU
LAST DAY OF ▶ 11/23

JOHN DOE

DEBIT CARD

DEBIT

*ABCD*

FIG. 1I

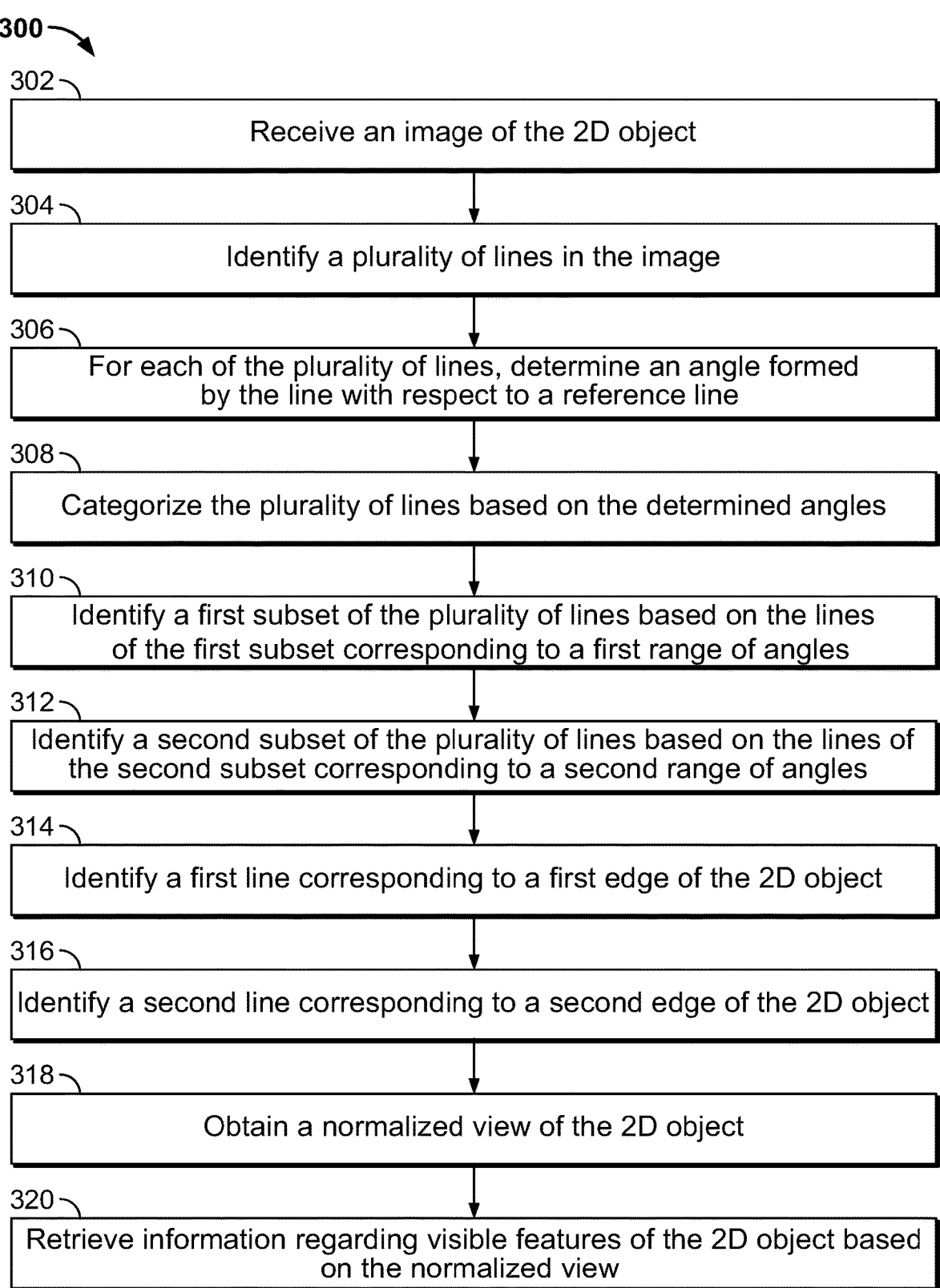

300

302

Receive an image of the 2D object

304

Identify a plurality of lines in the image

306

For each of the plurality of lines, determine an angle formed by the line with respect to a reference line

308

Categorize the plurality of lines based on the determined angles

310

Identify a first subset of the plurality of lines based on the lines of the first subset corresponding to a first range of angles

312

Identify a second subset of the plurality of lines based on the lines of the second subset corresponding to a second range of angles

314

Identify a first line corresponding to a first edge of the 2D object

316

Identify a second line corresponding to a second edge of the 2D object

318

Obtain a normalized view of the 2D object

320

Retrieve information regarding visible features of the 2D object based on the normalized view

FIG. 3

AUTOMATICALLY AUTHENTICATING AND INPUTTING OBJECT INFORMATION

BACKGROUND

E-commerce transactions such as online video entertainment business transactions (e.g., rental and/or purchase) may involve input and authentication of credit card information. According to a conventional online input and authentication method, a credit card number is manually typed in or entered, along with a name of the cardholder, expiration month/year and a security code (e.g., Card Verification Value (CVV)).

In the context of credit/debit cards, near-field communication (NFC) security features or other embedded security chips may be used to improve security. However, such features require that a card be positioned at a checkout terminal to be either in direct contact with or a short distance (e.g., within a few inches) away from a suitable card reader. As such, such features may not be readily applicable when carrying out an online e-commerce transaction.

SUMMARY

Aspects disclosed herein are directed toward a method for receiving and authenticating credit card information (e.g., in the context of online transactions).

For example, according to one aspect, credit card information is received and authenticated via sampling the credit card through space and time. For example, the information may be received and authenticated based on multi-angle and/or multi-time-point sampling and verification.

According to at least one embodiment, a method for authenticating a two-dimensional (2D) object includes: receiving an image of the 2D object; identifying a plurality of lines in the image; and, for each of the plurality of lines, determining an angle formed by the line with respect to a reference line. The method further includes: categorizing the plurality of lines based on the determined angles; identifying a first subset of the plurality of lines based on the lines of the first subset corresponding to a first range of angles; and identifying a second subset of the plurality of lines based on the lines of the second subset corresponding to a second range of angles. The method further includes: from among the lines of the first subset, identifying a first line corresponding to a first edge of the 2D object; and from among the lines of the second subset, identifying a second line corresponding to a second edge of the 2D object.

According to at least one embodiment, a machine-readable non-transitory medium has stored thereon machine-executable instructions for authenticating a two-dimensional (2D) object. The instructions include: receiving an image of the 2D object; identifying a plurality of lines in the image; and, for each of the plurality of lines, determining an angle formed by the line with respect to a reference line. The instructions further include: categorizing the plurality of lines based on the determined angles; identifying a first subset of the plurality of lines based on the lines of the first subset corresponding to a first range of angles; and identifying a second subset of the plurality of lines based on the lines of the second subset corresponding to a second range of angles. The instructions further include: from among the lines of the first subset, identifying a first line corresponding to a first edge of the 2D object; and from among the lines of the second subset, identifying a second line corresponding to a second edge of the 2D object.

According to at least one embodiment, an apparatus for authenticating a two-dimensional (2D) object includes: a network communication unit configured to transmit and receive data; and one or more processors. The one or more processors are configured to: receive an image of the 2D object; identify a plurality of lines in the image; for each of the plurality of lines, determine an angle formed by the line with respect to a reference line; categorize the plurality of lines based on the determined angles; identify a first subset of the plurality of lines based on the lines of the first subset corresponding to a first range of angles; identify a second subset of the plurality of lines based on the lines of the second subset corresponding to a second range of angles; from among the lines of the first subset, identify a first line corresponding to a first edge of the 2D object; and from among the lines of the second subset, identify a second line corresponding to a second edge of the 2D object.

BRIEF DESCRIPTION OF THE DRAWINGS

The above and other aspects and features of the present disclosure will become more apparent upon consideration of the following description of embodiments, taken in conjunction with the accompanying drawing figures.

FIG. 1I illustrates a bird's eye view of the card.

FIG. 3 illustrates a flowchart of a method of authenticating a two-dimensional (2D) object according to at least one embodiment.

DETAILED DESCRIPTION

Figure 1A:
FIG. 1A illustrates an image of a credit card.

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, as well as procedural, changes may be made without departing from the scope of the present invention. Wherever possible, the same reference numbers will be used throughout the drawings to refer to the same or similar parts.

Embodiments of the present invention relate to a system and method for authenticating a two-dimensional (2D) object. For purposes of explanation, various embodiments will be described with reference to a credit card. However, one of ordinary skill in the art will appreciate that this disclosure is not to be limited to applications involving a credit card, or the following discussion, and is applicable to various other types of cards (e.g., debit card), tickets, surfaces of commercial packaging, and objects (e.g., rect-angular and/or square-shaped objects) known to those skilled in the art.

In one or more aspects, a method for authenticating a credit card may involve flipping of a credit card to facilitate examination and/or inspection of visual features on the card such as a hologram and/or a photograph of the cardholder. In one or more aspects, manual typing (or entering) of credit card information such as credit card number, expiration month, security (e.g., CVV) code, etc., and manual verifi-cation of the entered information are not required.

Payment cards such as credit cards often have holograms as a security feature in order to prevent counterfeiting. In one or more aspects, examining and verifying a hologram may be performed by verifying whether objects imprinted in the hologram are visible at the expected position (e.g., objects imprinted in the hologram appearing and/or disap-pearing at the expected angles or orientations with respect to the viewer), and/or whether the hologram exhibits or illus-trates the objects expected for a particular credit card type or issuer.

In one or more aspects, when a photograph of the card-holder appears on the credit card, facial recognition (e.g., software-based facial recognition) may be used to verify that the person who is currently holding (or presenting) the card is the legitimate card holder. The facial recognition may be performed, for example, by comparing the photograph against a previously recorded (or previously supplied) pho-tograph of the cardholder.

In one or more aspects, a signature of the cardholder and/or coordinates (e.g., position) of the signature is veri-fied. In addition to the signature of the cardholder being unique, coordinates of the signature on the card may also be unique.

In one or more aspects, receiving credit card information may include receiving video that is captured in real-time or receiving pre-recorded video that is uploaded. In this regard, verification may be performed to verify that, over time, the credit card that appears in the video moves on a smooth or uninterrupted trajectory or a trajectory exhibiting gradual changes. Such verification may protect against attempts by a counterfeiter to edit the video before it is uploaded, because such an altered card might not appear on a smooth trajectory.

As will be described in more detail herein with reference to one or more aspects, object detection may be applied to detect an image of a credit card in a frame included in a video depicting flipping of the credit card. The input image may be either a portion of an image extracted from a video frame or an entire video frame. Via the object detection, coordinates of a bounding box of the detected credit card may be determined. For example, four edges (e.g., four peripheral edges) of the card may be detected. Although corners of a credit card are rounded, the intersections (e.g., the artificial corners) of the detected edges lines may be determined, even when, for example, one or more corners are obscured (e.g., by a finger or a hand).

FIG. 1A illustrates an image of a credit card 102. With reference to FIG. 1A, the credit card 102 is positioned such that images of the credit card can be captured by a camera (e.g., a camera of a computing device such as a personal computer or a mobile device). The credit card 102 is sampled through space and time, e.g., in a real-time record-ing. The length of the recording may be around several seconds (e.g., three seconds).

For example, during such a recording, the credit card 102 is flipped and/or rotated so that images of both the front and the back sides of the credit card can be captured. In addition, the credit card 102 is positioned at multiple angles, such that multiple perspectives can be captured by the camera. Accordingly, if the credit card 102 has a hologram, objects imprinted in the hologram will be visible in at least one of the captured images.

Processing of one or more images extracted from the video will now be described with reference to FIGS. 1B to 1H. For purposes of brevity, processing of a single image will be described with these figures. However, it is under-stood that features described may be applied to each of two or more images extracted from the video. For example, the described processing may be performed for each of two or more images (e.g., an image depicting a perspective view of a front side of the credit card 102, and an image depicting a perspective of a rear side of the credit card).

As will be described in more detail below, the processing may include performing a Visual Binary Edge Search Algo-rithm.

By way of example, the image that is selected for pro-cessing may be an image of a selected resolution (e.g., a selected resolution of 720p). Alternatively, the image may be selected as an image of a different resolution (e.g., a reso-lution that is more or less fine than 720p), or as an image of no particular resolution.

Figure 1B:
FIG. 1B illustrates a grayscale image of the credit card.

According to one or more aspects, the image of FIG. 1A is converted to a grayscale image. FIG. 1B illustrates a grayscale image of the credit card 102. Such conversion may reduce the amount (or quantity) of data that is to be processed.

According to one or more aspects, structural information regarding the credit card is extracted from the image of FIG. 1B. Extraction of such structural information may also reduce the amount (or quantity) of data that is to be processed. According to one or more aspects, extracting the structural information includes employing the technique of Canny edge detection. This technique is employed in various computer vision systems to detect a wide range of edges that are present in an image.

For example, with respect to the image of the credit card 102 in FIG. 1B, edges that may be detected include: edges of raised-surface features (e.g., in an embossed card, raised text and/or numerals corresponding to the name of the cardholder and/or the expiration date, etc.), edges of non-raised features (e.g., in an embossed or unembossed card, text and/or numbers that printed on a surface of the card), and/or peripheral edges of the card, etc.

Figure 1C:
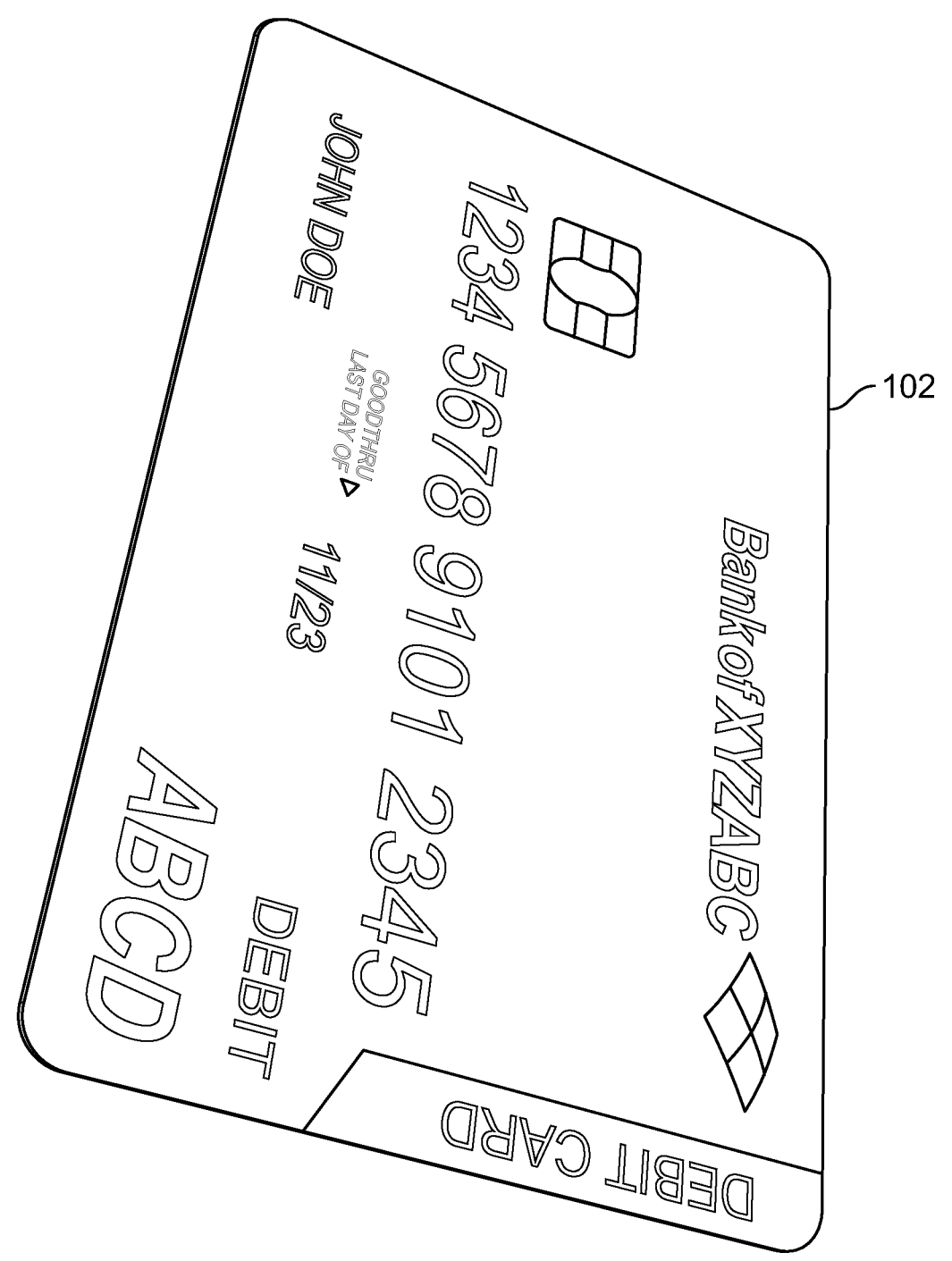
FIG. 1C illustrates structural information extracted from the image of FIG. 1B.

FIG. 1C illustrates structural information extracted from the image of FIG. 1B. The structural information corre-sponds to edges that are detected in the image of FIG. 1B. Such edges may be detected using Canny edge detection.

Figure 1D:
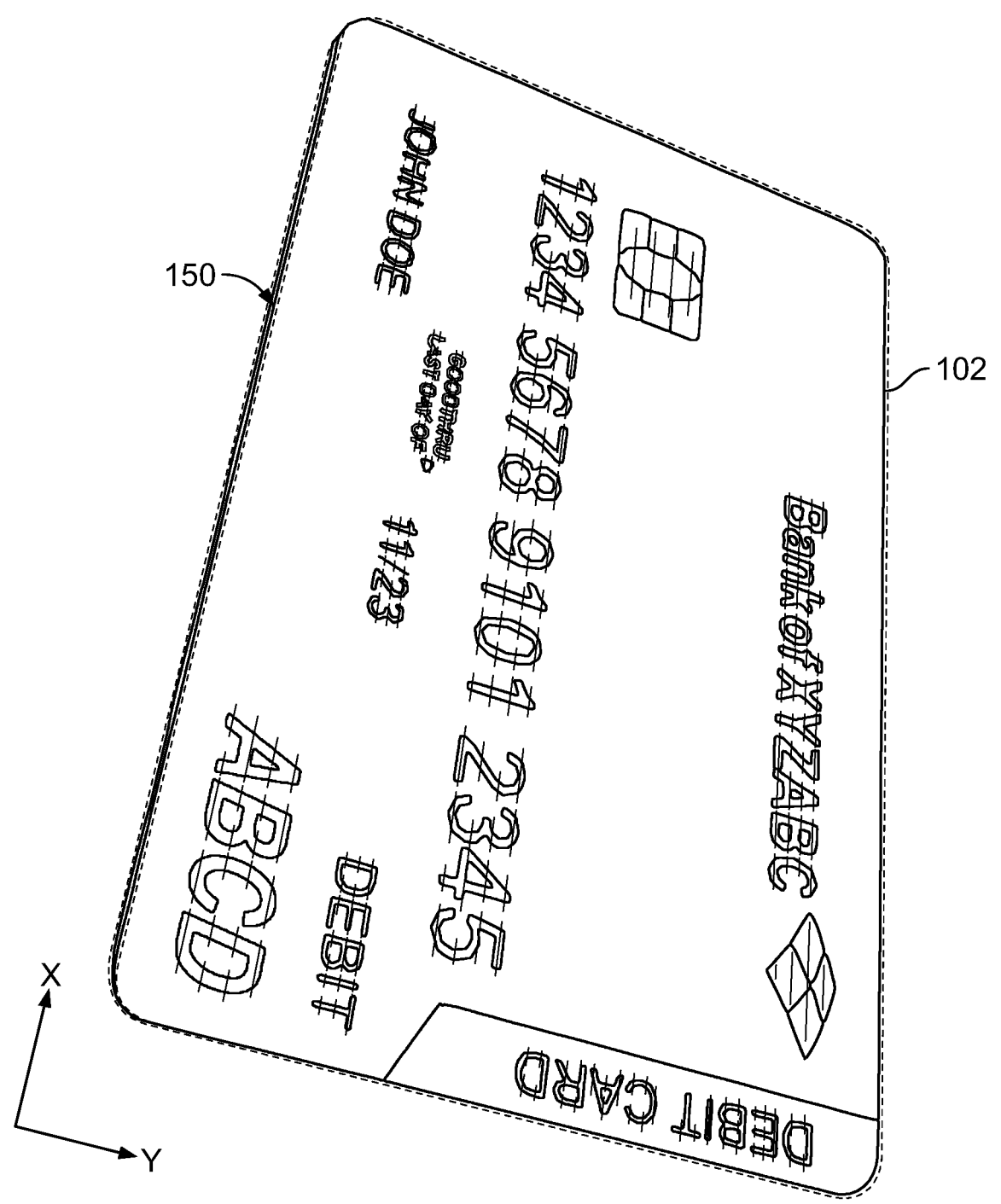
FIG. 1D illustrates further structural information extracted from the image of FIG. 1C.

FIG. 1D illustrates further structural information extracted from the image of FIG. 1C. In one or more aspects, a Hough transform for identifying lines (or positions thereof) in the image is performed. The Hough transform is an extraction technique used in areas such as image analysis, computer vision and digital image processing for finding imperfect instances of objects within a certain class of shapes. In this regard, a voting procedure may be used. For example, within a class of objects shaped like lines, the Hough transform may be used to detect lines that have a length of at least a certain number of pixels. The dashed lines in FIG. 1D illustrate the results of a Hough line transformation.

The structural information illustrated in FIG. 1D corresponds to lines that are detected in the image of FIG. 1C. Such lines may be identified using a Hough transform.

In one or more aspects, the lines that are identified via the Hough transform are categorized. For example, each line is categorized based on an angle that the line forms with respect to (or relative to) a reference line (e.g., a given line or axis).

For example, with continued reference to FIG. 1D, a line that extends parallel to a line 110 that appears to correspond to the bottom edge 150 of the credit card 102 may be selected as a reference line. In the context of a portrait view of the credit card 102, a line in the image of FIG. 1D may appear as extending vertically (e.g., purely vertically). Such a line would form an angle of approximately 90 degrees with respect to the X-axis of FIG. 1D.

Again in the context of a portrait view of the credit card 102, a line in the image of FIG. 1D may appear as extending horizontally (e.g., purely horizontally). Such a line would form an angle of approximately 0 degrees with respect to the X-axis.

Based on such angles, the lines that were identified via the Hough transform may be categorized. For example, categorization may be performed using a histogram.

Figure 1E:
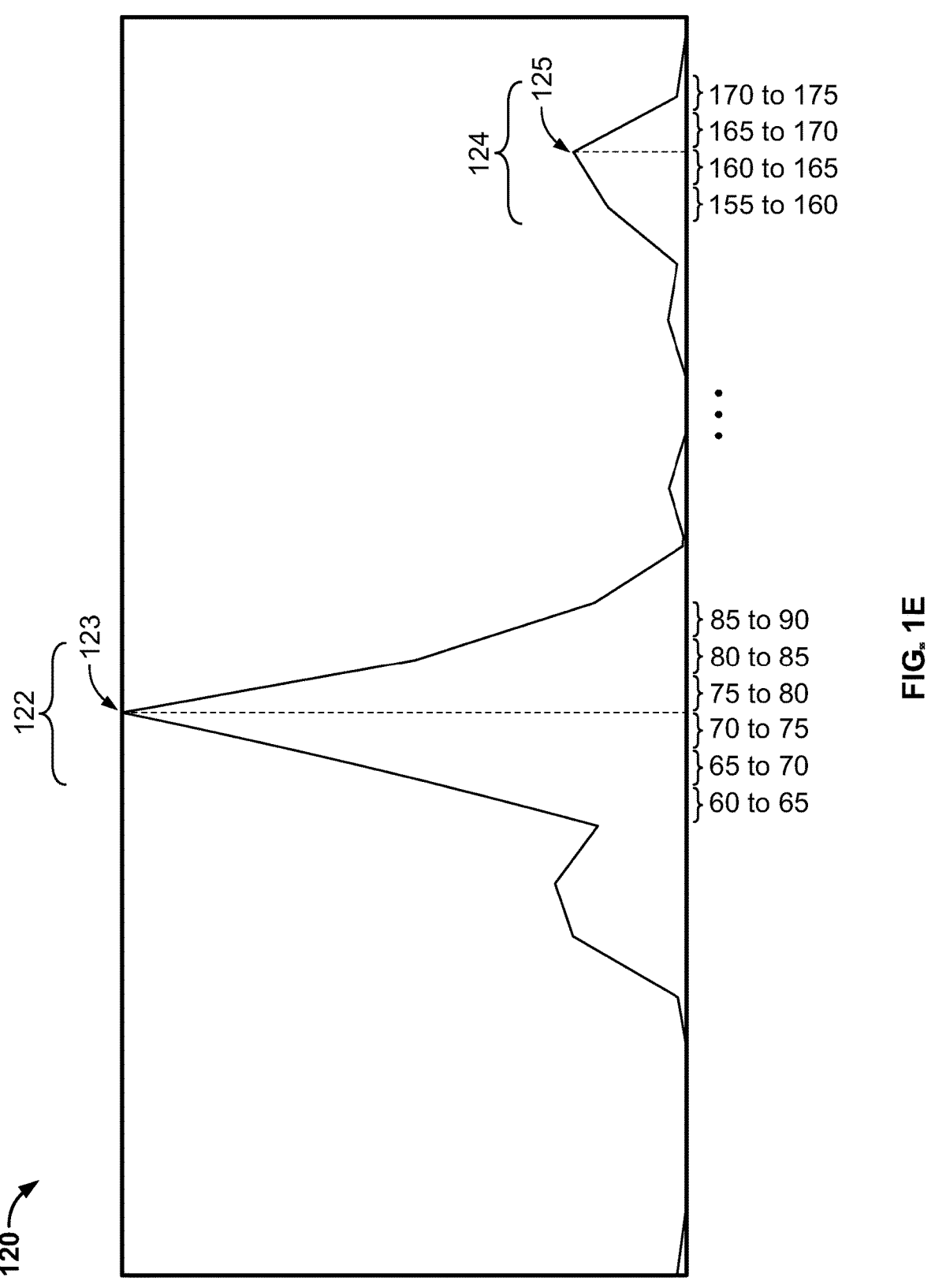
FIG. 1E illustrates an example histogram according to at least one embodiment.

FIG. 1E illustrates an example histogram 120 according to at least one embodiment. With respect to the horizontal axis (x-axis), a range of angles (e.g., −90 to 90 degrees) is divided into a series of intervals. Each interval may span a range of 5 degrees, such that consecutive intervals correspond, respectively, to a range of 75 to 80 degrees, a range of 80 to 85 degrees, a range of 85 to 90 degrees, etc.

Based on the angle that is formed with reference to the reference line, each line in the image of FIG. 1D is effectively categorized as falling in one of the intervals (or bins). For example, a line that forms an angle of 78 degrees is categorized as falling in the interval corresponding to 75 to 80 degrees. As another example, a line that forms an angle of 89 degrees is categorized as falling in the interval corresponding to 85 to 90 degrees. For each interval, the number of lines that are categorized as falling in the interval is counted.

Again in the context of a portrait view of the credit card 102, most lines in an image of the card tend to extend approximately horizontal or approximately vertical. For example, an approximately horizontal line would form an angle of approximately 0 degrees with respect to the X-axis. In contrast, an approximately vertical line would form an angle of approximately 90 degrees with respect to the X-axis. As such, in a histogram such as the histogram 120, two clusters tend to appear: a first cluster (e.g., a cluster corresponding to horizontal lines) that is centered about a first peak; and a second cluster (e.g., a cluster corresponding to vertical lines) that is centered about a second peak. The first peak and the second peak may tend to be separated from each other along the x-axis by approximately 90 degrees (or 18 intervals that each span 5 degrees).

For example, with reference to FIG. 1E, a first cluster 122 (e.g., a cluster corresponding to horizontal lines) is centered about a first peak 123. A second cluster 124 (e.g., a cluster corresponding to vertical lines) is centered about a second peak 125. Each cluster may be defined as being within a particular range of its respective peak. For example, the first cluster 122 may be defined as corresponding to a range of 10 degrees, plus or minus, of the first peak 123. As another example, the first cluster 122 may be defined as corresponding to a range of 15 degrees, plus or minus, of the first peak 123. Lines categorized as falling within an interval that at least partially overlaps with a cluster may be considered as falling within that cluster.

From among the lines belonging to a cluster, lines corresponding to edges of the periphery of the card may be identified. For example, from among the lines belonging to the first cluster 122 (e.g., the cluster corresponding to horizontal lines), lines corresponding to horizontal edges of the periphery of the credit card 102 may be identified. As another example, from among the lines belonging to the second cluster 124 (e.g., the cluster corresponding to vertical lines), lines corresponding to vertical edges of the periphery of the credit card 102 may be identified. Such identification will be described in more detail with reference to FIGS. 1F and 1G.

Figure 1F:
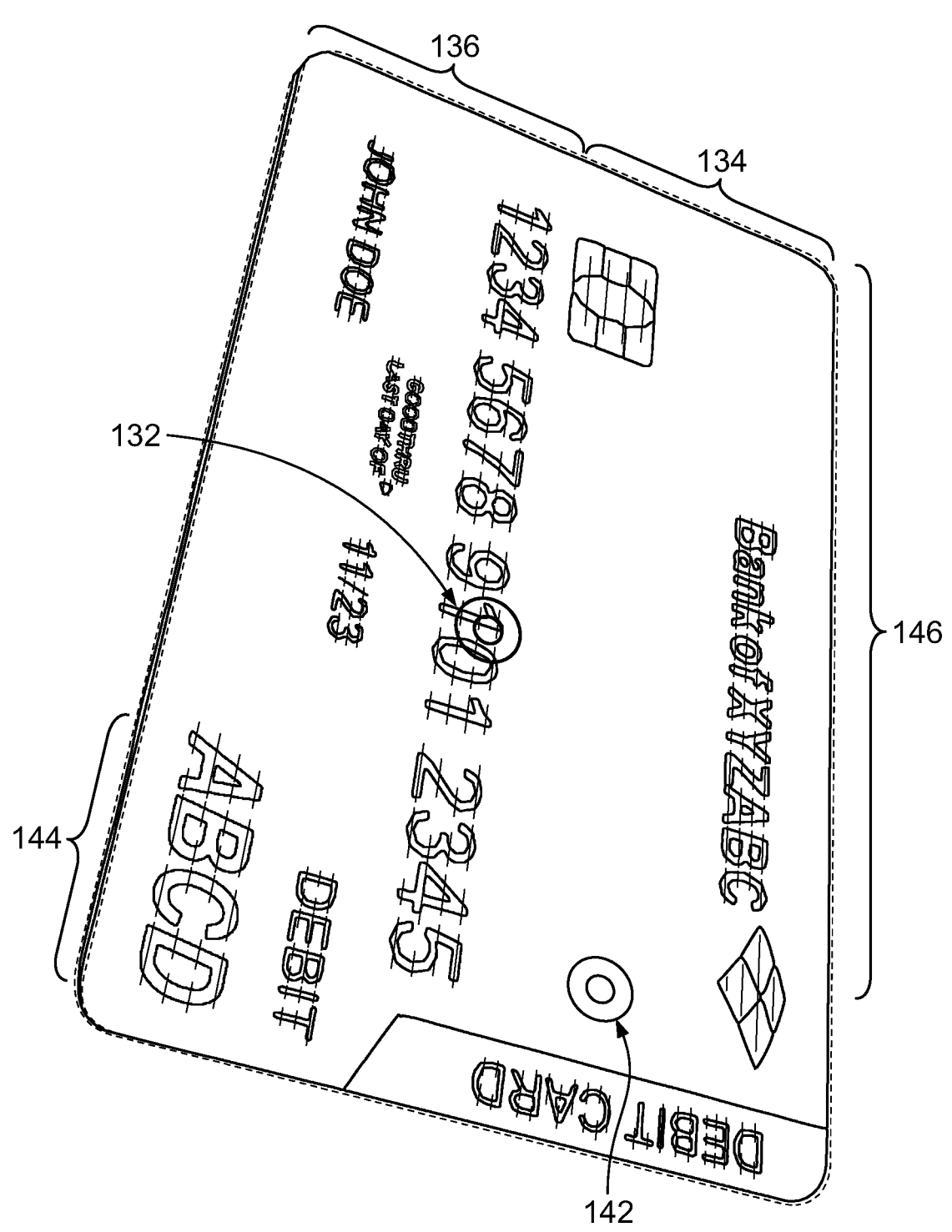
FIG. 1F illustrates division of lines belonging to a given cluster according to at least one embodiment.

FIG. 1F illustrates division of lines belonging to a given cluster according to at least one embodiment. The lines may be divided into two sub-groups. As will be described in more detail below, the division may be performed based on an identified interior point. According to at least one embodiment, a center of gravity (CG) of the lines belonging to a given cluster may be identified as the interior point. However, it is understood that another point may be selected as the interior point.

For example, with reference to the first cluster 122 of FIG. 1E, a midpoint of each line belonging to the cluster is identified. In more detail, for each such line, an x-coordinate and a y-coordinate of the corresponding midpoint is identified. The coordinates of such midpoints may be used to determine coordinates of the CG. For example, the x-coordinate of the CG may be determined as being an average value of the x-coordinates of the respective midpoints of the lines belonging to the first cluster 122. Similarly, the y-coordinate of the CG may be determined as being an average value of the y-coordinates of the respective midpoints of the lines belonging to the first cluster 122.

With continued reference to the first cluster 122, the CG may be used to divide lines belonging to the cluster into two sub-groups. As noted earlier, the lines belonging to the first cluster 122 correspond to horizontal lines. The CG may be used to divide these lines into a top sub-group and a bottom sub-group with respect to a normalized card orientation. For purposes of establishing a reference orientation, it is noted that the description herein of various embodiments will use the descriptors "top", "bottom," "left," "right," "horizontal" and "vertical" with respect to a normalized card orientation (e.g., see FIG. 1J). For example, FIG. 2A illustrates categorization of two example lines according to at least one embodiment. FIG. 2A illustrates a first line 200 and a second line 250. The first line 200 and the second line 250 are examples of lines in the first cluster 122 of FIG. 1E. As illustrated in FIG. 2A, the first line 200 has a midpoint M, and the second line 250 has a midpoint N. FIG. 2A also illustrates a CG 210 (e.g., of the lines in the first cluster 122). A reference vector 225 extends from the midpoint M toward the CG 210, and a reference vector 275 extends from the midpoint N to the CG 210. Each line may be categorized based on a rotational direction of its corresponding reference line with respect to the line itself.

For example, each reference vector 225, 275 may be rotated about its corresponding midpoint M, N to overlap with its corresponding line 200, 250. When rotated in such a manner, the reference vector 225, 275 is positioned to point toward a certain direction. For example, the reference vector 225, 275 is positioned to point to the right. In this situation, if the rotational direction of the reference vector is counterclockwise, then the corresponding line is further categorized as belonging to the top sub-group from the perspective of a normalized card orientation. For example, with reference to FIG. 2A, the rotational direction of the reference vector 225 is determined to be counter-clockwise. As such, the corresponding line 200 is further categorized as belonging to the top sub-group from the perspective of a normalized card orientation. Alternatively, if the rotational direction of the reference vector is clockwise, then the corresponding line is further categorized as belonging to the bottom sub-group from the perspective of a normalized card orientation. For example, with reference to FIG. 2A, the rotational direction of the reference vector 275 is determined to be clockwise. As such, the corresponding line 250 is further categorized as belonging to the bottom sub-group from the perspective of a normalized card orientation.

As illustrated in FIG. 1F, a CG 132 is identified for lines belonging to the first cluster 122. Like in FIG. 1D, the dashed lines in FIG. 1F illustrate the results of a Hough line transformation. From among the lines belonging to the first cluster 122, lines (or midpoints of lines) that are located in a region 134 are further categorized as belonging to the top sub-group from the perspective of a normalized card orientation. From among the lines belonging to the first cluster 122, lines (or midpoints of lines) that are located in a region 136 are further categorized as belonging to the bottom sub-group from the perspective of a normalized card orientation.

Similarly, a CG may be determined for lines belonging to the second cluster 124 of FIG. 1E from the perspective of a normalized card orientation. For example, a midpoint of each line belonging to the cluster is identified. In more detail, for each such line, an x-coordinate and a y-coordinate of the corresponding midpoint is identified. The coordinates of such midpoints may be used to determine coordinates of the CG. For example, the x-coordinate of the CG may be determined as being an average value of the x-coordinates of the respective midpoints of the lines belonging to the second cluster 124. Similarly, the y-coordinate of the CG may be determined as being an average value of the y-coordinates of the respective midpoints of the lines belonging to the second cluster 124.

With continued reference to the second cluster 124, the CG may be used to divide lines belonging to the cluster into two sub-groups. As noted earlier, the lines belonging to the second cluster 124 correspond to vertical lines. The CG may be used to divide these lines into a left sub-group and a right sub-group from the perspective of a normalized card orientation. For example, the categorization of each line belonging to the second cluster 124 may be performed in a manner similar to that which was described earlier with reference to FIG. 2A.

Figure 2A:
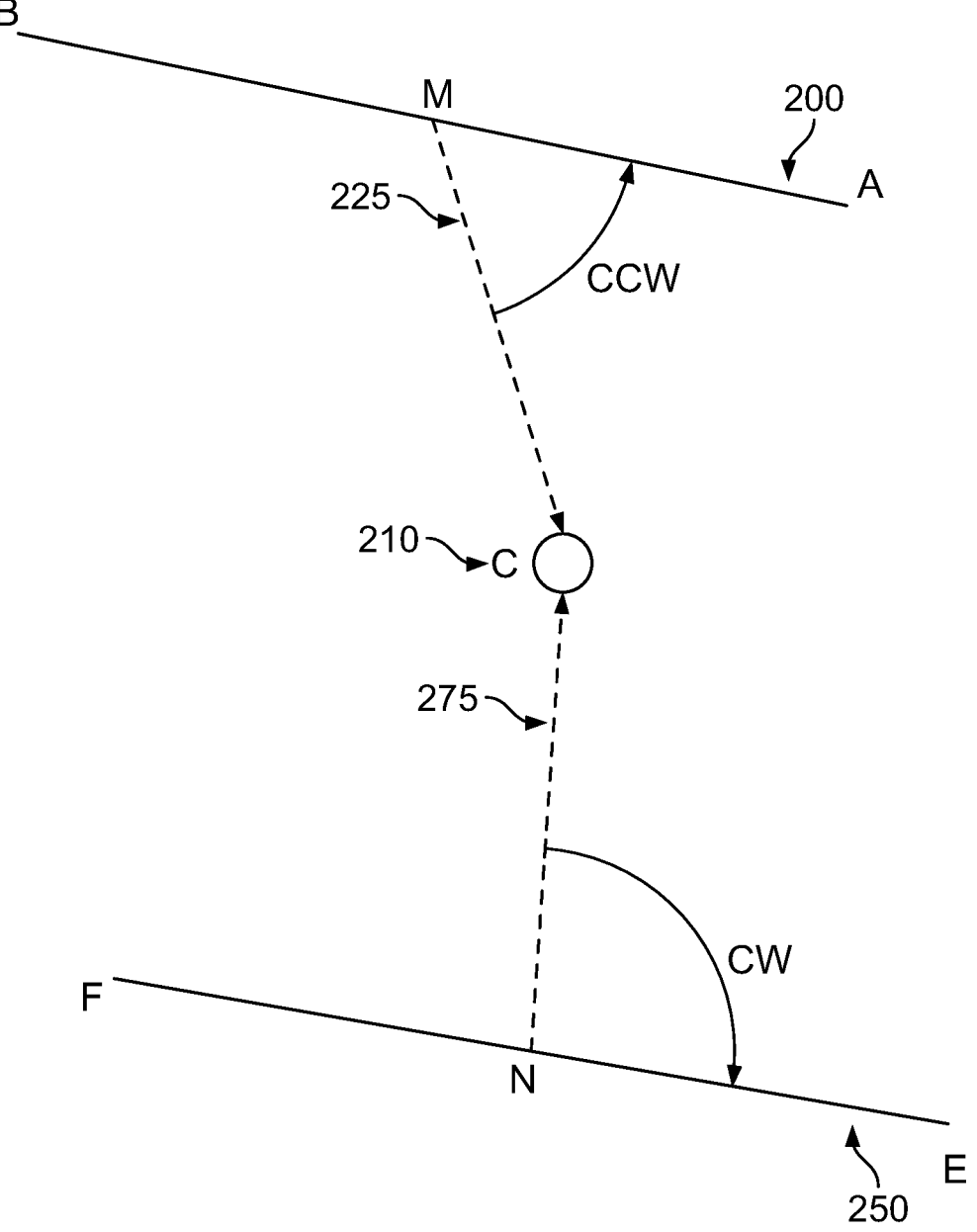
FIG. 2A illustrates categorization of two example lines according to at least one embodiment.
Figure 2B:
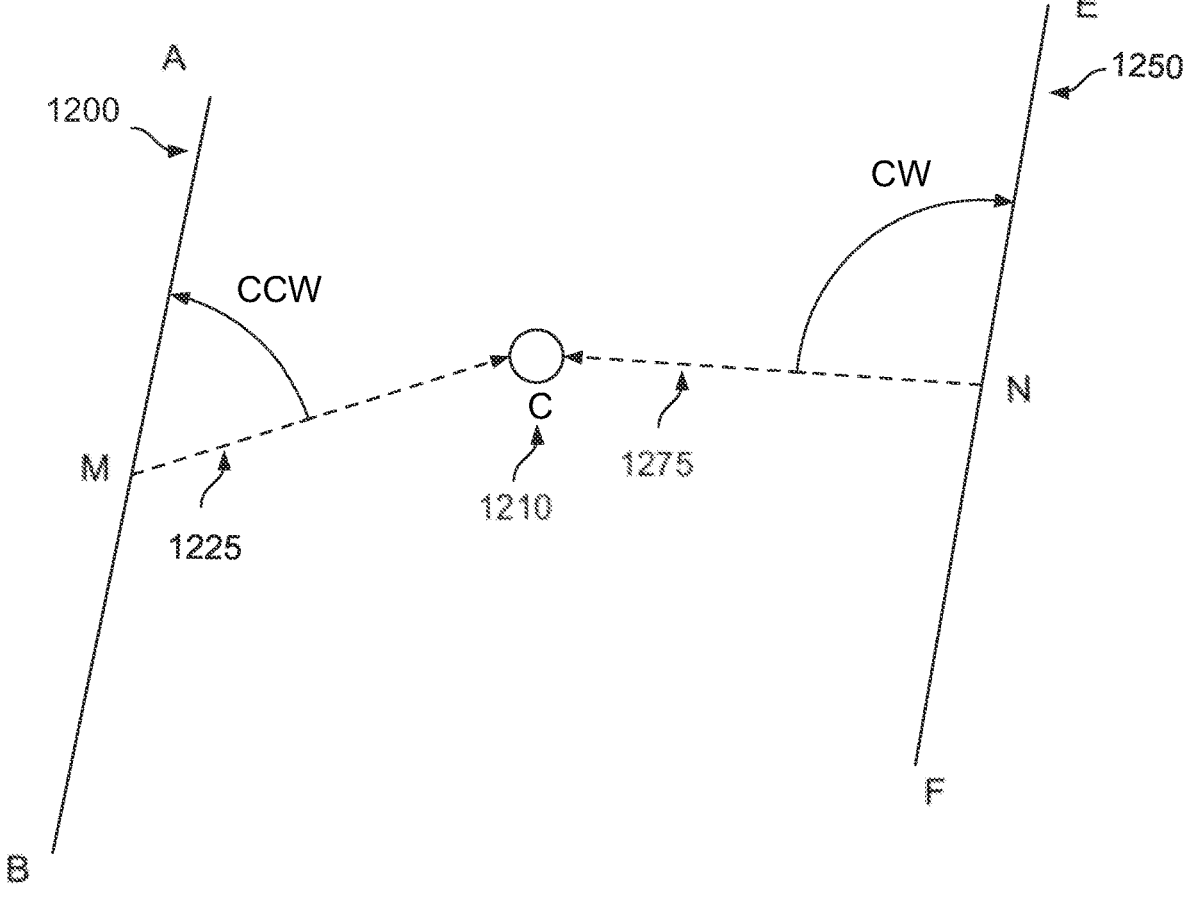
FIG. 2B illustrates categorization of two example lines according to at least one embodiment.

For example, FIG. 2B illustrates categorization of two example lines according to at least one embodiment. FIG. 2B illustrates a first line 1200 and a second line 1250. The first line 1200 and the second line 1250 are examples of lines in the second cluster 124 of FIG. 1E. As illustrated in FIG. 2B, the first line 1200 has a midpoint M, and the second line 1250 has a midpoint N. FIG. 2B also illustrates a CG 1210 (e.g., of the lines in the second cluster 124). A reference vector 1225 extends from the midpoint M toward the CG 1210, and a reference vector 1275 extends from the midpoint N to the CG 1210. Each line may be categorized based on a rotational direction of its corresponding reference line with respect to the line itself.

For example, each reference vector 1225, 1275 may be rotated about its corresponding midpoint M, N to overlap with its corresponding line 1200, 1250. When rotated in such a manner, the reference vector 1225, 1275 is positioned to point toward a certain direction. For example, the reference vector 1225, 1275 is positioned to point to the top (upwards). In this situation, if the rotational direction of the reference vector is counter-clockwise, then the corresponding line is further categorized as belonging to the left sub-group from the perspective of a normalized card orientation. For example, with reference to FIG. 2B, the rotational direction of the reference vector 1225 is determined to be counterclockwise. As such, the corresponding line 1200 is further categorized as belonging to the left sub-group from the perspective of a normalized card orientation. Alternatively, if the rotational direction of the reference vector is clockwise, then the corresponding line is further categorized as belonging to the right sub-group from the perspective of a normalized card orientation. For example, with reference to FIG. 2B, the rotational direction of the reference vector 1275 is determined to be clockwise. As such, the corresponding line 1250 is further categorized as belonging to the right sub-group from the perspective of a normalized card orientation.

As illustrated in FIG. 1F, a CG 142 is identified for lines belonging to the second cluster 124. From among the lines belonging to the second cluster 124, lines (or midpoints of lines) that are located in a region 144 (e.g., a region located at the right of bracket 146 in FIG. 1F) are further categorized as belonging to the right sub-group from the perspective of a normalized card orientation. From among the lines belonging to the second cluster 122, lines (or midpoints of lines) that are located in a region 146 are further categorized as belonging to the left sub-group from the perspective of a normalized card orientation.

As described earlier with reference to various embodiments, categorization may be performed by, first, categorizing lines that correspond to a dominating peak in a histogram (e.g., see cluster 122 of FIG. 1E) and lines that correspond to a minor peak in the histogram (e.g., see cluster 124 of FIG. 1E). According to at least one embodiment, other lines may be discarded, or not further considered.

Then, the lines that correspond to the dominating peak are further categorized as belonging to either a clockwise (CW) sub-group or a counter-clockwise (CCW) sub-group (e.g., see earlier description regarding top and bottom sub-groups with reference to FIG. 2A). Similarly, the lines that correspond to the minor peak are further categorized as belonging to either a clockwise (CW) sub-group or a counter-clockwise (CCW) sub-group (e.g., see earlier description regarding left and right sub-groups with reference to FIG. 2A). The division of each cluster into sub-groups aids identification of (e.g., search for) lines corresponding to peripheral edges of the card. For example, as noted earlier, lines corresponding to horizontal edges of the periphery of the card may be identified from among the lines belonging to the first cluster 122. The identification of the line corresponding to one horizontal edge of the periphery of the card (i.e., the line corresponding to the top edge of the periphery of the card) may be identified from among the lines belonging to the top sub-group from the perspective of a normalized card orientation.

Figure 1G:
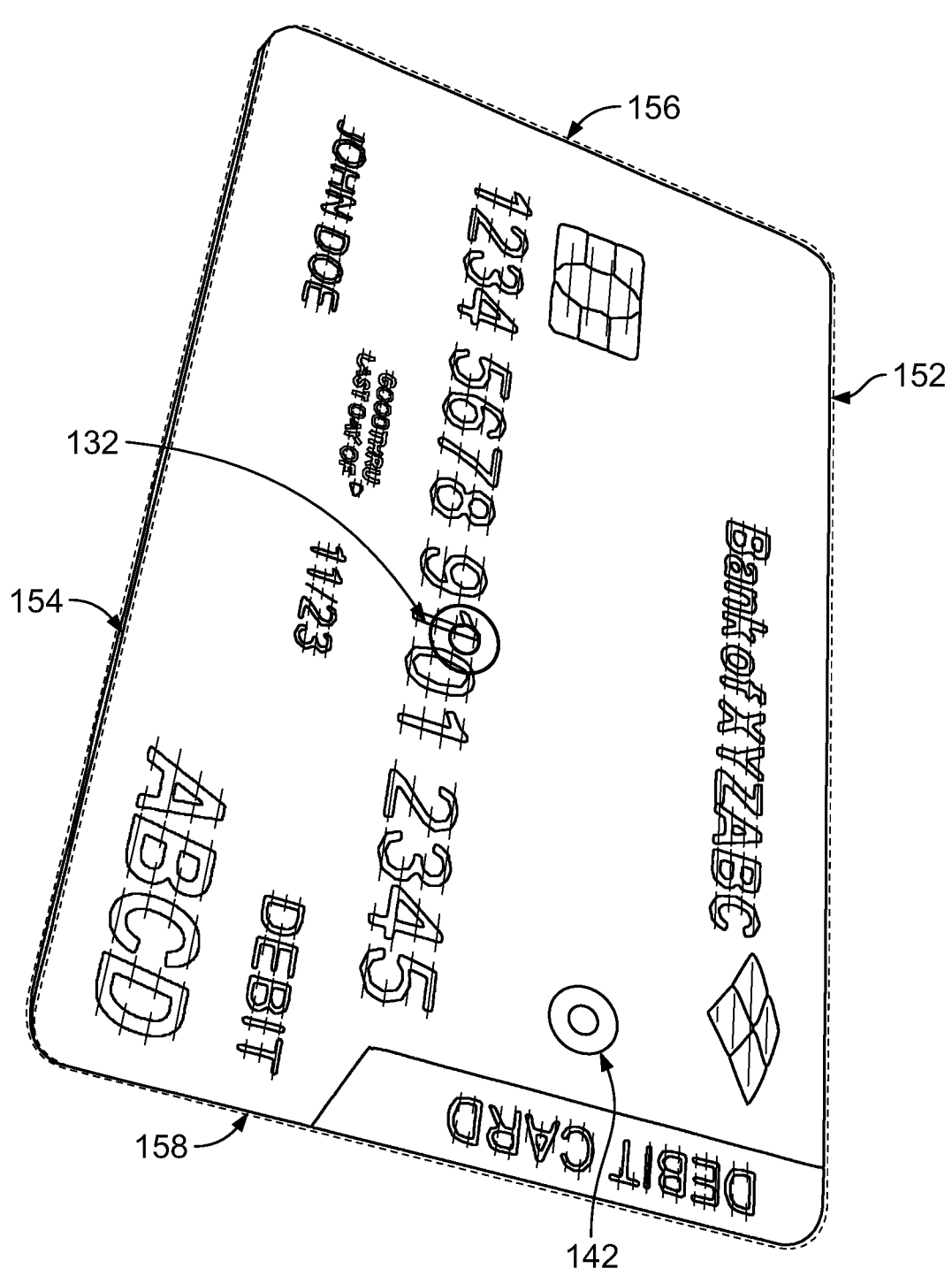
FIG. 1G illustrates identification of lines corresponding to peripheral edges of a card according to at least one embodiment.

FIG. 1G illustrates identification of lines corresponding to peripheral edges of a card according to at least one embodiment. Like in FIG. 1D, the dashed lines in FIG. 1G illustrate the results of a Hough line transformation.

For example, as illustrated in FIG. 1G, the line 152 is identified, from among the lines belonging to the top sub-group from the perspective of a normalized card orientation, as corresponding to the top edge of the periphery of the credit card 102. This identification may be based on one or more factors. One such factor may be a distance from the CG 132 to the line 152. Here, it is recognized that it is generally expected that, among the lines belonging to the top sub-group, the line corresponding to the top edge will be located further away from the CG 132. In at least one embodiment, other factors are also used to determine the edge of a card, such as the distance from an end point of an edge of +/−90 degree, and/or whether there is a 90 arc connecting 2 edges which are 90 degrees away from each other.

Another factor may be the magnitude of an angle that the line forms with respect to one or more different lines identified as corresponding to an adjacent edge of the periphery of the card. As will be noted again later, with respect to the second cluster 124, the identification of the line corresponding to one vertical edge of the periphery of the card (i.e., the line corresponding to the left edge of the periphery of the card) may be identified from among the lines belonging to the left sub-group.

For example, as illustrated in FIG. 1G, the line 156 is identified, from among the lines belonging to the left sub-group, as corresponding to the left edge of the periphery of the card. The identification of the line 152 (as corresponding to the top edge of the periphery of the card) may be based on whether the line 152 forms (or most closely forms) a right angle with respect to the line 156. Here, it is recognized that it is typically expected that, among the lines belonging to the top sub-group from the perspective of a normalized card orientation, the line corresponding to the top edge will form a right angle with respect to a line corresponding to an adjacent edge.

Another factor may relate to the distance between an endpoint of the line and an endpoint of a line identified as corresponding to an adjacent edge of the periphery of the card. As noted earlier, the line 156 is identified, from among the lines belonging to the left sub-group, as corresponding to the left edge of the periphery of the card. Similarly, the line 158 may be identified, from among the lines belonging to the right sub-group, as corresponding to the right edge of the periphery of the card. Here, the identification of the line 152 (as corresponding to the top edge of the periphery of the card) may be based on determining that a distance between an endpoint of the line 152 and an endpoint of line 156 as being minimal (e.g., the shortest). Similarly, the identification of the line 152 (as corresponding to the top edge of the periphery of the card) may be based on determining that a distance between an endpoint of the line 152 and an endpoint of line 158 being minimal.

Similarly, the identification of the line corresponding to the other horizontal edge of the periphery of the card (i.e., the line corresponding to the bottom edge of the periphery of the card) may be identified from among the lines belonging to the bottom sub-group from the perspective of a normalized card orientation. For example, as illustrated in FIG. 1G, the line 158 is identified, from among the lines belonging to the bottom sub-group, as corresponding to the bottom edge of the periphery of the credit card 102.

Similarly, with respect to the second cluster 124, the identification of the line corresponding to one vertical edge of the periphery of the card (i.e., the line corresponding to the left edge of the periphery of the card) may be identified from among the lines belonging to the left sub-group. For example, as illustrated in FIG. 1G, the line 156 is identified, from among the lines belonging to the left sub-group, as corresponding to the left edge of the periphery of the credit card 102.

Similarly, the identification of the line corresponding to the other vertical edge of the periphery of the card (i.e., the line corresponding to the right edge of the periphery of the card) may be identified from among the lines belonging to the right sub-group. For example, as illustrated in FIG. 1G, the line 158 is identified, from among the lines belonging to the bottom sub-group from the perspective of a normalized card orientation, as corresponding to the bottom edge of the periphery of the credit card 102.

Once lines respectively corresponding to the four edges of the periphery of the credit card 102 are identified, then the lines may be extended so that adjacent lines intersect. As noted earlier, the corners of a credit card are rounded. Therefore, the lines respectively corresponding to the four edges may not intersect (or meet) each other (see, e.g., FIG. 1G).

In one or more aspects, coordinates of intersections (e.g., the artificial corners) of the lines are calculated. The coordinates may be calculated by calculating the intersections of adjacent lines. Accordingly, the lines are extended based on the calculated coordinates.

Figure 1H:
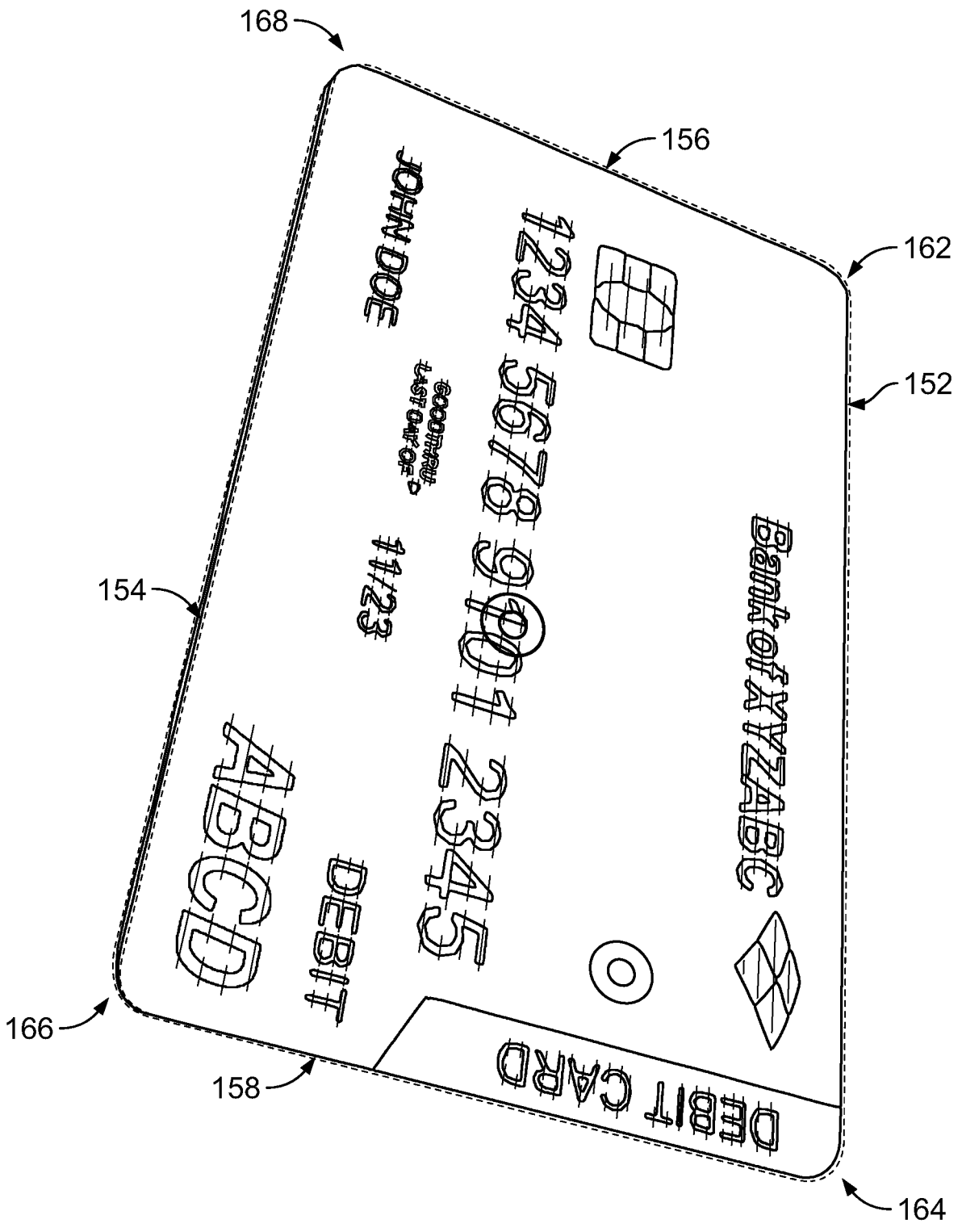
FIG. 1H illustrates extension of lines according to at least one embodiment.

FIG. 1H illustrates extension of lines according to at least one embodiment. For example, the line 152 and the line 156 may be extended such that the lines meet at corner 162. Similarly, the line 152 and the line 158 may be extended such that the lines meet at corner 164. Similarly, the line 154 and the line 156 may be extended such that the lines meet at corner 168. Similarly, the line 154 and the line 158 may be extended such that the lines meet at corner 166. Like in FIG. 1D, the dashed lines in FIG. 1H illustrate the results of a Hough line transformation.

Determining the coordinates of the four corners (e.g., corners 162, 164, 166, 168) facilitates generation of a bird's eye view of the card. A bird's eye view transformation generates a top view perspective of an image. In the context of a payment card such as a credit card, a normalized size of the card is known. Accordingly, a normalized perspective ratio is also known. Given that the normalized size of the card is known, once the coordinates of the four corners are also known, then a homography/projective transformation may be performed to obtain a normalized bird's eye view. For example, once such information is known regarding an image of a credit card, then a homography/projective transformation may be performed to transform the image of the card from that of an angled (e.g., tilted) view to that of a normalized bird's eye view. After such a normalized view is obtained, then processing may continue.

Figure 1I:
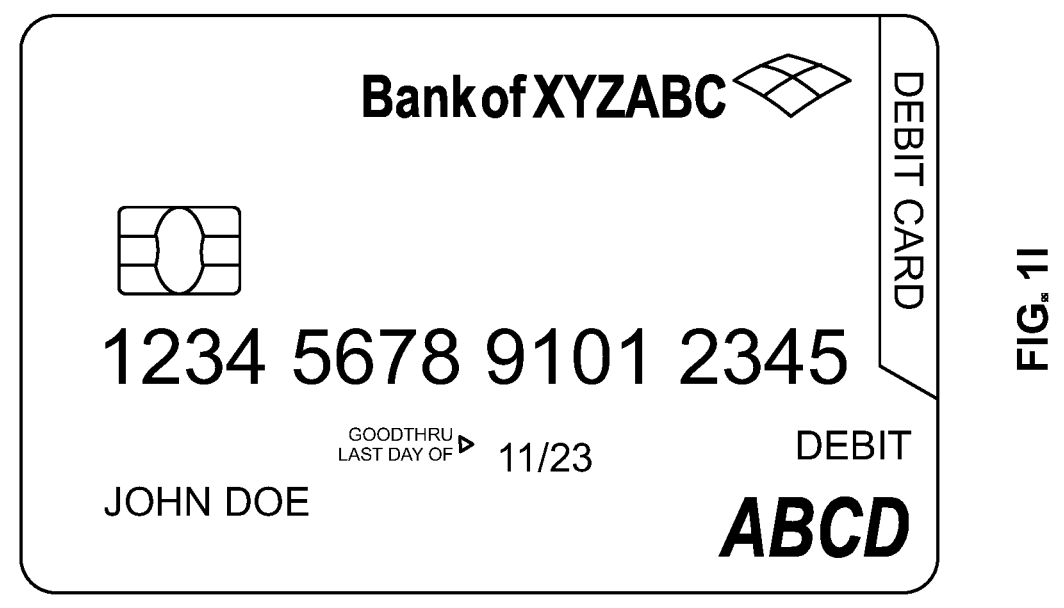

For example, FIG. 1I illustrates a bird's eye view of the card 102.

Figure 1J:
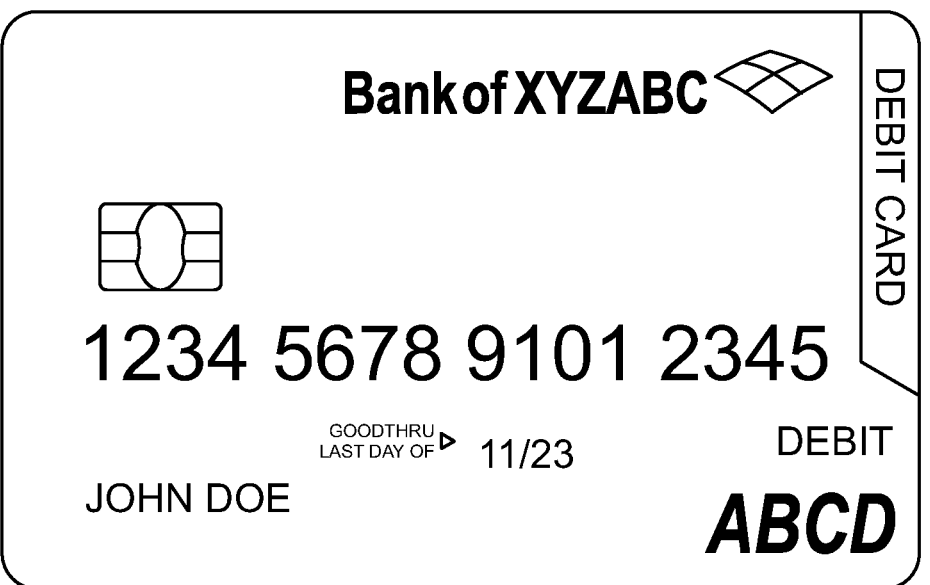
FIG. 1J illustrates the bird's eye view of FIG. 1J, as rotated counter-clockwise by 90 degrees.

FIG. 1J illustrates the bird's eye view of FIG. 1J, as rotated counter-clockwise by 90 degrees.

Upon obtaining the normalized view, visible features of the credit card 102 may be recognized and/or retrieved. For example, features can be recognized and/or retrieved using optical character recognition (OCR) technology. Such features may include the name of the issuer (e.g., bank, financial institution), the brand of the credit card (Visa, Master-Card, etc.), the credit card number, the name of the cardholder's name, expiration month and year, etc. In addition, if the credit card 102 includes a photograph of the cardholder, such a photograph may be recognized and verified using artificial intelligence (AI) Facial Recognition.

In addition, a signature of the cardholder and an underlying image of a hologram can be recognized by calculating feature descriptor distances between the captured image and known copies of the signature and hologram images at various angles. Known copies of the signature may be obtained, for example, from a signature provided in the cardholder's application documents. In addition (or alternatively), known copies of the signature may be obtained from previously recorded signatures of the cardholder, as captured in one or more previous transactions.

As disclosed earlier, the described processing may be performed for each of two or more images (e.g., an image depicting a perspective view of a front side of the credit card 102, and an image depicting a perspective of a rear side of the credit card). As such, a normalized view of the front side of the credit card 102 and a normalized view of the rear side of the credit card 102 may be obtained. To improve security, such normalized views may be analyzed against a set of known credit card images from different credit card issuers. In general, different issuers issue cards having different features (e.g., logo, bank name) and/or features located at different locations. For example, features that may be analyzed include the hologram, signature box location, credit card issuer, credit card font, credit card type, credit card color, and cardholder's photograph.

FIG. 3 illustrates a flowchart of a method 300 of authenticating a two-dimensional (2D) object according to at least one embodiment.

At block 302, an image of the 2D object is received. For example, as described earlier with reference to FIG. 1A, an image of a credit card 102 is received.

According to one or more aspects, a video depicting positioning of the 2D object at a plurality of angles over time may be recorded or received. The image may be extracted from the recorded or received video.

At block 304, a plurality of lines are identified in the image. For example, as described earlier with reference to FIG. 1D, structural information is extracted from the image of FIG. 1C. In this regard, lines that have a length of at least a certain number of pixels may be identified.

According to one or more aspects, a plurality of edges in the image may be detected via Canny edge detection. Based on the detected plurality of edges, the plurality of lines may be identified by performing a Hough transform.

At block 306, for each of the plurality of lines, an angle formed by the line with respect to X-axis (e.g., X-axis of the captured image) is determined.

At block 308, the plurality of lines are categorized based on the determined angles.

According to one or more aspects, the plurality of lines may be categorized via a histogram. For example, based on the angle that is formed with reference to the reference line, each line in the image of FIG. 1D is effectively categorized as falling in one of the intervals (or bins) in the example histogram 120 of FIG. 1E.

At block 310, a first subset of the plurality of lines is identified based on the lines of the first subset corresponding to a first range of angles.

At block 312, a second subset of the plurality of lines is identified based on the lines of the second subset corresponding to a second range of angles.

According to one or more aspects, the first subset of the plurality of lines may be centered around a first peak of the histogram, and the second subset of the plurality of lines may be centered around a second peak of the histogram. The first peak and the second peak may be separated from each other by approximately 90 degrees.

For example, with reference to FIG. 1E, a first cluster 122 (e.g., a cluster corresponding to horizontal lines) is centered about a first peak 123. A second cluster 124 (e.g., a cluster corresponding to vertical lines) is centered about a second peak 125.

At block 314, from among the lines of the first subset, a first line corresponding to a first edge of the 2D object is identified.

According to one or more aspects, the first subset may be divided into a first sub-group of lines and a second sub-group of lines based on x-y coordinates of an interior point of the image. The interior point may correspond to a center of gravity (CG) of the lines of the first subset. For each line of the first subset, x-y coordinates of a midpoint of the line may be determined. An x-coordinate of the CG may be determined to be an average of the determined x-coordinates of the midpoints of the lines of the first subset. A y-coordinate of the CG may be determined to be an average of the determined y-coordinates of the midpoints of the lines of the first subset. The first subset may be divided into the first sub-group and the second sub-group based on the determined x-y coordinates of the CG. The first line may be identified, from among the lines of the first sub-group, based on a distance between the CG and the first line and other factors. In at least one embodiment, other factors are also used to determine the edge of a card, such as the distance from an end point of an edge of +/−90 degree, and/or whether there is a 90 arc connecting 2 edges which are 90 degrees away from each other.

For example, with reference to FIG. 1G, the line 152 is identified, from among the lines belonging to the top sub-group from the perspective of a normalized card orientation, as corresponding to the top edge of the periphery of the credit card 102.

At block 316, from among the lines of the second subset, a second line corresponding to a second edge of the 2D object is identified.

For example, with continued reference to FIG. 1G, the line 156 is identified, from among the lines belonging to the left sub-group, as corresponding to the left edge of the periphery of the card.

At block 318, at least one of the first line or the second line is extended such that the first line and the second line intersect.

For example, with reference to FIG. 1H, the line 152 and the line 156 may be extended such that the lines meet at corner 162.

At block 320, a normalized view of the 2D object is obtained, and information regarding visible features of the 2D object is retrieved based on the normalized view.

In at least some embodiments, one or more systems are configured to implement and/or perform features described herein (e.g., features described earlier with reference to FIGS. 1A to 1J, 2 and/or 3). Such a system may include one or more software or hardware computer systems and may further include (or may be operably coupled to) one or more hardware memory systems for storing information including databases for storing, accessing, and querying various content, encoded data, shared addresses, metadata, etc. In hardware implementations, the one or more computer systems incorporate one or more computer processors and controllers.

Features described herein may be each implemented in a hardware processor of the one or more computer systems, and, in one embodiment, a single processor may be configured to implement the various components. The hardware system may include various transitory and non-transitory memory for storing information, wired and wireless communication receivers and transmitters, displays, and input and output interfaces and devices. The various computer systems, memory, and components of the system may be operably coupled to communicate information, and the system may further include various hardware and software communication modules, interfaces, and circuitry to enable wired or wireless communication of information.

Figure 4:
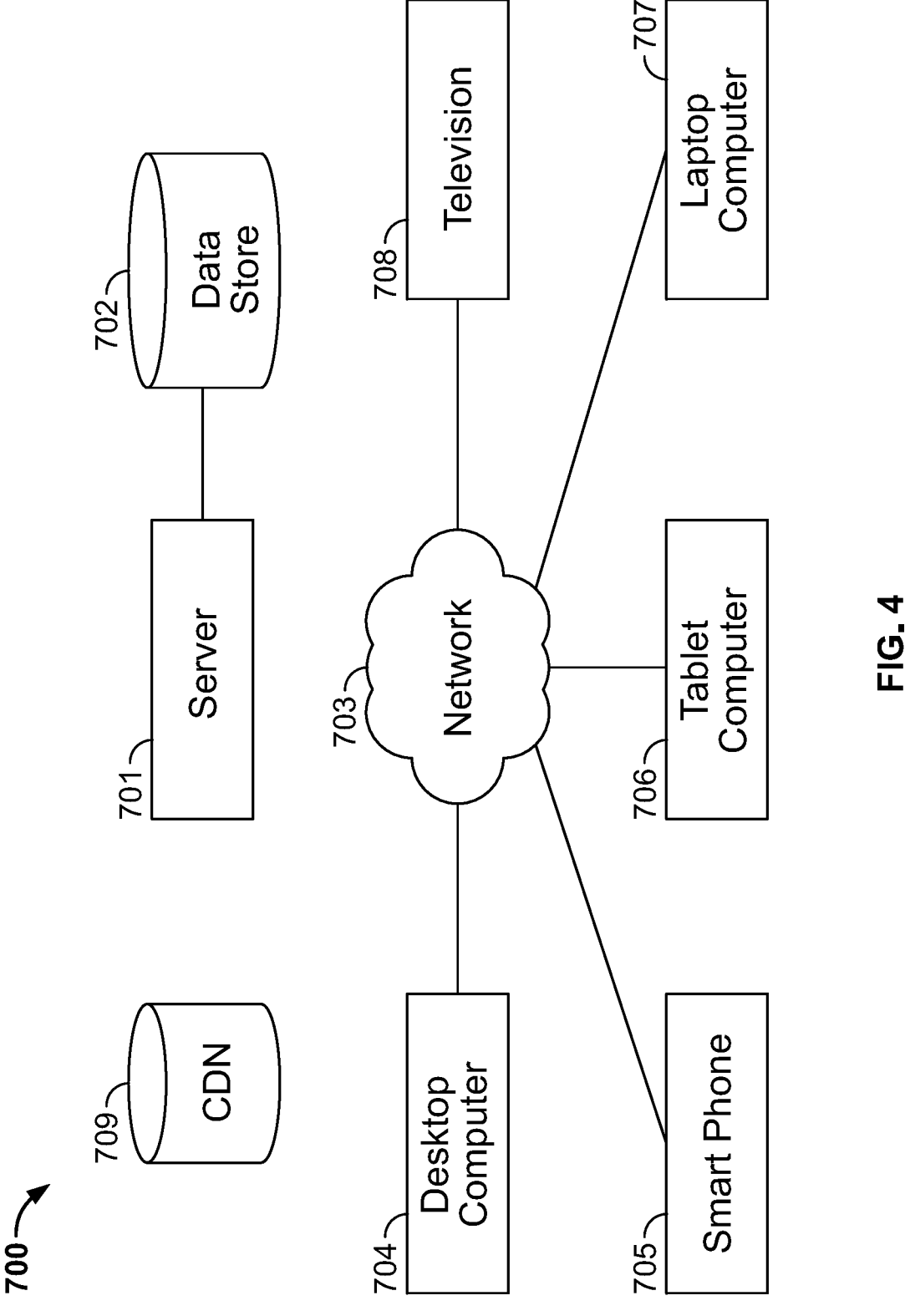
FIG. 4 is an illustration of a computing environment according to at least one embodiment.

In selected embodiments, features and aspects described herein may be implemented within a computing environment 700, as shown in FIG. 4, which may include one or more computer servers 701. The server 701 may be operatively coupled to one or more data stores 702 (for example, databases, indexes, files, or other data structures). The server 701 may connect to a data communication network 703 including a local area network (LAN), a wide area network (WAN) (for example, the Internet), a telephone network, a satellite or wireless communication network, or some combination of these or similar networks.

One or more client devices 704, 705, 706, 707, 708 may be in communication with the server 701, and a corresponding data store 702 via the data communication network 703. Such client devices 704, 705, 706, 707, 708 may include, for example, one or more laptop computers 707, desktop computers 704, smartphones and mobile phones 705, tablet computers 706, televisions 708, or combinations thereof. In operation, such client devices 704, 705, 706, 707, 708 may send and receive data or instructions to or from the server 701 in response to user input received from user input devices or other input. In response, the server 701 may serve data from the data store 702, alter data within the data store 702, add data to the data store 702, or the like, or combinations thereof.

In selected embodiments, the server 701 may transmit one or more media files including audio and/or video content, encoded data, generated data, and/or metadata from the data store 702 to one or more of the client devices 704, 705, 706, 707, 708 via the data communication network 703. The devices may output the audio and/or video content from the media file using a display screen, projector, or other display output device. In certain embodiments, the computing environment 700 configured in accordance with features and aspects described herein may be configured to operate within or support a cloud computing environment. For example, a portion of, or all of, the data store 702 and server 701 may reside in a cloud server.

Figure 5:
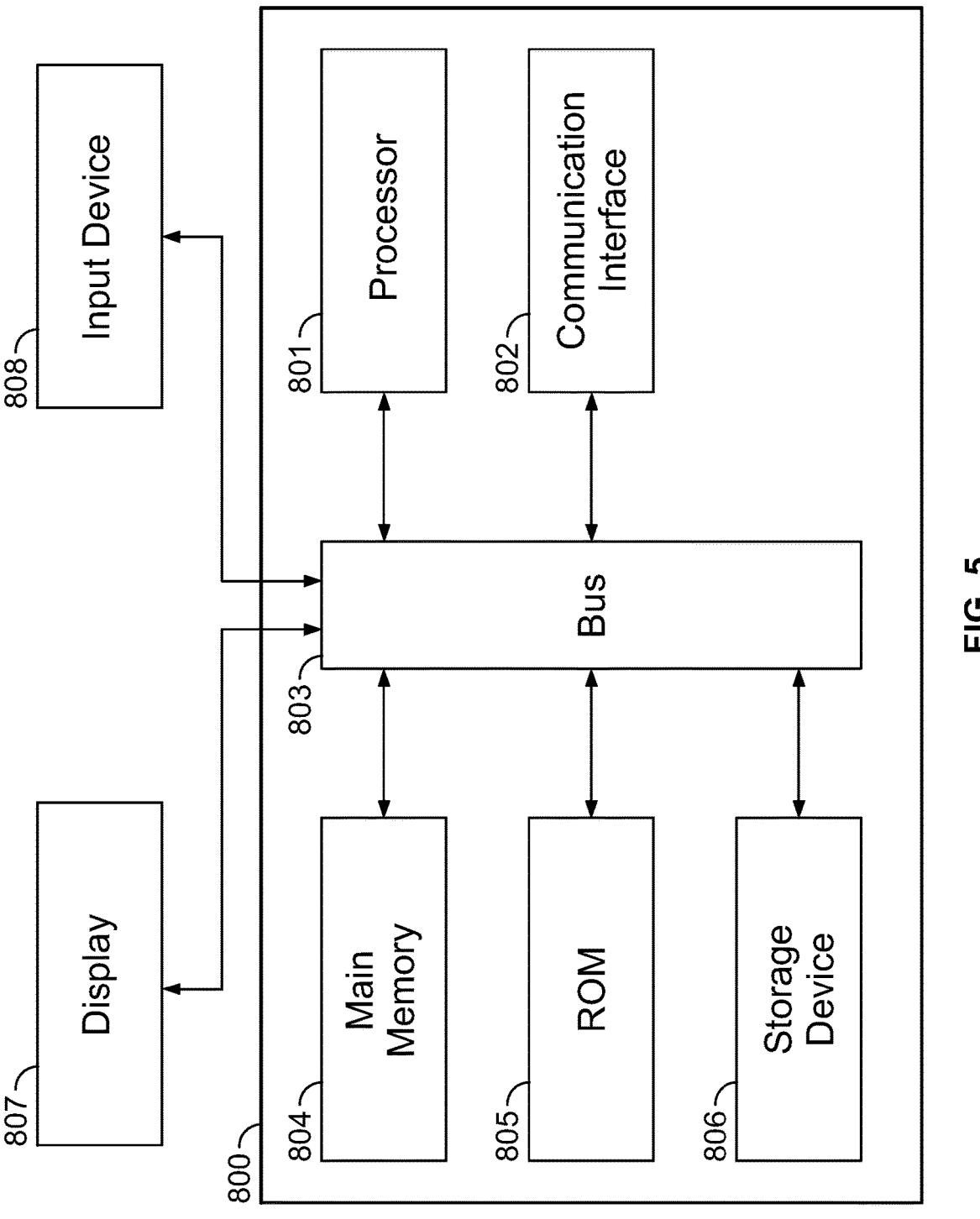
FIG. 5 is a block diagram of a device according to at least one embodiment.

With reference to FIG. 5, an illustration of an example computer 800 is provided. One or more of the devices 704, 705, 706, 707, 708 of the computing environment 700 may be configured as or include such a computer 800.

In selected embodiments, the computer 800 may include a bus 803 (or multiple buses) or other communication mechanism, a processor 801, main memory 804, read only memory (ROM) 805, one or more additional storage devices 806, and/or a communication interface 802, or the like or sub-combinations thereof. Embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

The bus 803 or other communication mechanism, including multiple such buses or mechanisms, may support communication of information within the computer 800. The processor 801 may be connected to the bus 803 and process information. In selected embodiments, the processor 801 may be a specialized or dedicated microprocessor configured to perform particular tasks in accordance with the features and aspects described herein by executing machine-readable software code defining the particular tasks. Main memory 804 (for example, random access memory—or RAM—or other dynamic storage device) may be connected to the bus 803 and store information and instructions to be executed by the processor 801. Main memory 804 may also store temporary variables or other intermediate information during execution of such instructions.

ROM 805 or some other static storage device may be connected to a bus 803 and store static information and instructions for the processor 801. The additional storage device 806 (for example, a magnetic disk, optical disk, memory card, or the like) may be connected to the bus 803. The main memory 804, ROM 805, and the additional storage device 806 may include a non-transitory computer-readable medium holding information, instructions, or some combination thereof—for example, instructions that, when executed by the processor 801, cause the computer 800 to perform one or more operations of a method as described herein. The communication interface 802 may also be connected to the bus 803. A communication interface 802 may provide or support two-way data communication between the computer 800 and one or more external devices (for example, other devices contained within the computing environment).

In selected embodiments, the computer 800 may be connected (for example, via the bus 803) to a display 807. The display 807 may use any suitable mechanism to communicate information to a user of a computer 800. For example, the display 807 may include or utilize a liquid crystal display (LCD), light emitting diode (LED) display, projector, or other display device to present information to a user of the computer 800 in a visual display. One or more input devices 808 (for example, an alphanumeric keyboard, mouse, microphone) may be connected to the bus 803 to communicate information and commands to the computer 800. In selected embodiments, one input device 808 may provide or support control over the positioning of a cursor to allow for selection and execution of various objects, files, programs, and the like provided by the computer 800 and displayed by the display 807.

The computer 800 may be used to transmit, receive, decode, display, etc. one or more video files. In selected embodiments, such transmitting, receiving, decoding, and displaying may be in response to the processor 801 executing one or more sequences of one or more instructions contained in main memory 804. Such instructions may be read into main memory 804 from another non-transitory computer-readable medium (for example, a storage device).

Execution of sequences of instructions contained in main memory 804 may cause the processor 801 to perform one or more of the procedures or steps described herein. In selected embodiments, one or more processors in a multi-processing arrangement may also be employed to execute sequences of instructions contained in main memory 804. Alternatively, or in addition thereto, firmware may be used in place of, or in connection with, software instructions to implement procedures or steps in accordance with the features and aspects described herein. Thus, embodiments in accordance with features and aspects described herein may not be limited to any specific combination of hardware circuitry and software.

Non-transitory computer readable medium may refer to any medium that participates in holding instructions for execution by the processor 801, or that stores data for processing by a computer, and include all computer-readable media, with the sole exception being a transitory, propagating signal. Such a non-transitory computer readable medium may include, but is not limited to, non-volatile media, volatile media, and temporary storage media (for example, cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, the communication interface 802 may provide or support external, two-way data communication to or via a network link. For example, the communication interface 802 may be a wireless network interface controller or a cellular radio providing a data communication network connection. Alternatively, the communication interface 802 may include a LAN card providing a data communication connection to a compatible LAN. In any such embodiment, the communication interface 802 may send and receive electrical, electromagnetic, or optical signals conveying information.

A network link may provide data communication through one or more networks to other data devices (for example, client devices as shown in the computing environment 700). For example, a network link may provide a connection through a local network of a host computer or to data equipment operated by an Internet Service Provider (ISP). An ISP may, in turn, provide data communication services through the Internet. Accordingly, a computer 800 may send and receive commands, data, or combinations thereof, including program code, through one or more networks, a network link, and communication interface 802. Thus, the computer 800 may interface or otherwise communicate with a remote server (for example, server 701), or some combination thereof.

The various devices, modules, terminals, and the like described herein may be implemented on a computer by execution of software comprising machine instructions read from computer-readable medium, as discussed above. In certain embodiments, several hardware aspects may be implemented using a single computer; in other embodiments, multiple computers, input/output systems and hardware may be used to implement the system.

For a software implementation, certain embodiments described herein may be implemented with separate software modules, such as procedures and functions, each of which performs one or more of the functions and operations described herein. The software codes can be implemented with a software application written in any suitable programming language and may be stored in memory and executed by a controller or processor.

The foregoing described embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for authenticating, during an online transaction, a two-dimensional (2D) object comprising a payment card comprising a credit card or a debit card, the method comprising:
   receiving an image of the 2D object,
   wherein receiving the image of the 2D object comprises:
   recording or receiving a video depicting positioning of the 2D object at a plurality of angles over time; and
   extracting the image from the recorded or received video;
   identifying a plurality of lines in the image;
   for each of the plurality of lines, determining an angle formed by the line with respect to a reference line;
   categorizing the plurality of lines based on the determined angles;
   identifying a first subset of the plurality of lines based on the lines of the first subset corresponding to a first range of angles;
   identifying a second subset of the plurality of lines based on the lines of the second subset corresponding to a second range of angles;
   from among the lines of the first subset, identifying a first line corresponding to a first edge of the 2D object;
   from among the lines of the second subset, identifying a second line corresponding to a second edge of the 2D object;
   obtaining a normalized view of the 2D object; and
   retrieving information regarding visible features of the 2D object based on the normalized view,
   wherein:
   categorizing the plurality of lines comprises categorizing the plurality of lines via a histogram;
   the first subset of the plurality of lines is centered around a first peak of the histogram; and
   the second subset of the plurality of lines is centered around a second peak of the histogram.

2. The method of claim 1, wherein identifying the plurality of lines in the image comprises:
   detecting a plurality of edges in the image via Canny edge detection; and
   based on the detected plurality of edges, identifying the plurality of lines by performing a Hough transform.

3. The method of claim 1, wherein the first peak and the second peak are separated from each other by approximately 90 degrees.

4. The method of claim 1, wherein identifying the first line corresponding to the first edge of the 2D object comprises dividing the first subset into a first sub-group of lines and a second sub-group of lines based on x-y coordinates of an interior point of the image.

5. The method of claim 4, wherein:
   the interior point corresponds to a center of gravity (CG) of the lines of the first subset; and
   dividing the first subset into the first sub-group and the second sub-group comprises:
   for each line of the first subset, determining x-y coordinates of a midpoint of the line;
   determining an x-coordinate of the CG to be an average of the determined x-coordinates of the midpoints of the lines of the first subset;
   determining a y-coordinate of the CG to be an average of the determined y-coordinates of the midpoints of the lines of the first subset; and dividing the first subset into the first sub-group and the second sub-group based on the determined x-y coordinates of the CG.

6. The method of claim 5, wherein identifying the first line corresponding to the first edge of the 2D object comprises identifying the first line, from among the lines of the first sub-group, based on a distance between the CG and the first line.

7. The method of claim 1, further comprising:
extending at least one of the first line or the second line such that the first line and the second line intersect.

8. A machine-readable non-transitory medium having stored thereon machine-executable instructions for authenticating, during an online transaction, a two-dimensional (2D) object comprising a payment card comprising a credit card or a debit card, the instructions comprising:
receiving an image of the 2D object,
wherein receiving the image of the 2D object comprises:
recording or receiving a video depicting positioning of the 2D object at a plurality of angles over time; and
extracting the image from the recorded or received video;
identifying a plurality of lines in the image;
for each of the plurality of lines, determining an angle formed by the line with respect to a reference line;
categorizing the plurality of lines based on the determined angles;
identifying a first subset of the plurality of lines based on the lines of the first subset corresponding to a first range of angles;
identifying a second subset of the plurality of lines based on the lines of the second subset corresponding to a second range of angles;
from among the lines of the first subset, identifying a first line corresponding to a first edge of the 2D object;
from among the lines of the second subset, identifying a second line corresponding to a second edge of the 2D object;
obtaining a normalized view of the 2D object; and
retrieving information regarding visible features of the 2D object based on the normalized view,
wherein:
categorizing the plurality of lines comprises categorizing the plurality of lines via a histogram;
the first subset of the plurality of lines is centered around a first peak of the histogram; and
the second subset of the plurality of lines is centered around a second peak of the histogram.

9. The machine-readable non-transitory medium of claim 8, wherein identifying the plurality of lines in the image comprises:
detecting a plurality of edges in the image via Canny edge detection; and based on the detected plurality of edges, identifying the plurality of lines by performing a Hough transform.

10. The machine-readable non-transitory medium of claim 8, wherein the first peak and the second peak are separated from each other by approximately 90 degrees.

11. The machine-readable non-transitory medium of claim 8, wherein identifying the first line corresponding to the first edge of the 2D object comprises dividing the first subset into a first sub-group of lines and a second sub-group of lines based on x-y coordinates of an interior point of the image.

12. An apparatus for authenticating, during an online transaction, a two-dimensional (2D) object comprising a payment card comprising a credit card or a debit card, the apparatus comprising:
a network communication unit configured to transmit and receive data; and
one or more processors configured to:
receive an image of the 2D object by:
recording or receiving a video depicting positioning of the 2D object at a plurality of angles over time; and
extracting the image from the recorded or received video;
identify a plurality of lines in the image;
for each of the plurality of lines, determine an angle formed by the line with respect to a reference line;
categorize the plurality of lines based on the determined angles;
identify a first subset of the plurality of lines based on the lines of the first subset corresponding to a first range of angles;
identify a second subset of the plurality of lines based on the lines of the second subset corresponding to a second range of angles;
from among the lines of the first subset, identify a first line corresponding to a first edge of the 2D object;
from among the lines of the second subset, identify a second line corresponding to a second edge of the 2D object;
obtain a normalized view of the 2D object; and
retrieve information regarding visible features of the 2D object based on the normalized view,
wherein:
the one or more processors are further configured to categorize the plurality of lines by categorizing the plurality of lines via a histogram;
the first subset of the plurality of lines is centered around a first peak of the histogram; and
the second subset of the plurality of lines is centered around a second peak of the histogram.

* * * * *